(12) United States Patent
Ju et al.

(10) Patent No.: US 12,072,510 B2
(45) Date of Patent: Aug. 27, 2024

(54) CAMERA MODULE

(71) Applicant: Samsung Electro-Mechanics Co., Ltd., Suwon-si (KR)

(72) Inventors: Ga Yeon Ju, Suwon-si (KR); Yeun Ho Jung, Suwon-si (KR); Jung Kyun Cho, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 197 days.

(21) Appl. No.: 17/332,233

(22) Filed: May 27, 2021

(65) Prior Publication Data

US 2022/0011590 A1 Jan. 13, 2022

(30) Foreign Application Priority Data

Jul. 10, 2020 (KR) .................. 10-2020-0085141

(51) Int. Cl.
*G02B 27/64* (2006.01)
*G02B 5/00* (2006.01)
*G02B 13/00* (2006.01)
*G02B 27/00* (2006.01)
*G03B 13/36* (2021.01)

(52) U.S. Cl.
CPC .......... *G02B 27/646* (2013.01); *G02B 5/003* (2013.01); *G02B 13/0065* (2013.01); *G02B 27/0018* (2013.01); *G03B 13/36* (2013.01)

(58) Field of Classification Search
CPC .......... G02B 13/0065; G02B 27/0018; G02B 13/007; G03B 17/17
See application file for complete search history.

(56) References Cited

U.S. PATENT DOCUMENTS

| 10,175,458 | B2 | 1/2019 | Tseng et al. |
| 10,488,631 | B2 | 11/2019 | Bachar et al. |
| 10,866,430 | B2 | 12/2020 | Kim et al. |
| 2007/0195417 | A1* | 8/2007 | Yamamoto ........... H04N 9/3114 359/590 |
| 2009/0120566 | A1* | 5/2009 | Okayama ............... G02B 1/118 156/230 |

(Continued)

FOREIGN PATENT DOCUMENTS

| CN | 101632981 A | 1/2010 |
| CN | 107925717 A | 4/2018 |

(Continued)

OTHER PUBLICATIONS

Machine translation of WO2013073189 retrieved electronically from PE2E Search Feb. 8, 2023 (Year: 2023).*

(Continued)

*Primary Examiner* — Cara E Rakowski
(74) *Attorney, Agent, or Firm* — NSIP Law

(57) ABSTRACT

A camera module includes a housing including an opening and configured to accommodate an optical path conversion unit and a lens module, a shielding member configured to shield the opening of the housing, and a reflection reducing member disposed on an inner surface of the shielding member and configured to reduce internal reflections from the inner surface of the shielding member occurring between an end of the lens module and an image sensor.

16 Claims, 12 Drawing Sheets

(56) References Cited

U.S. PATENT DOCUMENTS

| | | | |
|---|---|---|---|
| 2009/0239083 A1 | 9/2009 | Kojima et al. | |
| 2014/0029103 A1* | 1/2014 | Budleski | G02B 5/003 359/584 |
| 2014/0354824 A1* | 12/2014 | Oh | H04N 23/55 348/164 |
| 2016/0370580 A1 | 12/2016 | Takada et al. | |
| 2017/0059857 A1 | 3/2017 | Laroia et al. | |
| 2017/0269356 A1 | 9/2017 | Suzuki et al. | |
| 2018/0143403 A1* | 5/2018 | Tseng | G02B 13/0065 |
| 2019/0121103 A1 | 4/2019 | Bachar et al. | |
| 2019/0129197 A1* | 5/2019 | Kim | G03B 5/00 |
| 2019/0361323 A1 | 11/2019 | Jerby et al. | |
| 2022/0066182 A1* | 3/2022 | Büeler | G02B 3/14 |

FOREIGN PATENT DOCUMENTS

| | | | |
|---|---|---|---|
| CN | 107976766 A | 5/2018 | |
| CN | 108107542 A | 6/2018 | |
| CN | 109581785 A | 4/2019 | |
| CN | 109725474 A | 5/2019 | |
| CN | 111308637 A | 6/2020 | |
| JP | 2009-229542 A | 10/2009 | |
| JP | 2015-25826 A | 2/2015 | |
| JP | 2016-114659 A | 6/2016 | |
| JP | 2017-134306 A | 8/2017 | |
| KR | 10-2018-0003539 A | 1/2018 | |
| KR | 10-2018-0116767 A | 10/2018 | |
| WO | WO-2013073189 A1 * | 5/2013 | G02B 27/0018 |
| WO | WO 2015/133431 A1 | 9/2015 | |
| WO | WO-2019102313 A1 * | 5/2019 | G02B 13/0065 |

OTHER PUBLICATIONS

Chinese Office Action issued on Jan. 28, 2023, in counterpart Chinese Patent Application No. 202110701313.X (6 pages in English, 8 pages in Chinese).

Chinese Office Action issued on Jun. 24, 2023, in counterpart Chinese Patent Application No. 202110701313.X (5 pages in English, 6 pages in Chinese).

*The Control of The Stray Light*, "Infrared and Laser Engineering" editorial department of the 8358$^{th}$ Institute of the Third Academy of China Aerospace Science and Industry Corporation, Optical System Design, p. 234, Mar. 2004, (2 pages in English, 2 pages in Chinese).

Chinese Office Action issued on Nov. 2, 2023, in counterpart Chinese Patent Application No. 202110701313.X (6 pages in English, 7 pages in Chinese).

* cited by examiner

III-III'

VII-VII'

XIII-XIII'

CAMERA MODULE

CROSS-REFERENCE TO RELATED APPLICATIONS

This application claims the benefit under 35 USC 119(a) of Korean Patent Application No. 10-2020-0085141 filed on Jul. 10, 2020, in the Korean Intellectual Property Office, the entire disclosure of which is incorporated herein by reference for all purposes.

BACKGROUND

1. Field

This application relates to a camera module configured to reduce a flare phenomenon and a resolution degradation phenomenon caused by internal reflections.

2. Description of Related Art

Camera modules are mounted in portable electronic devices. For example, a camera module may be mounted in a smartphone, a notebook computer, or any other portable electronic device. Smartphones, notebook computers, and other portable devices are typically thin, and thus there may be limitations on the size of camera modules that may be mounted in such thin portable electronic devices or the performance of such camera modules. For example, a camera module having a long focal length may be difficult to mount in a thin portable electronic device.

To prevent the above-described problem, a camera module having an optical path conversion unit for converting an optical path, such as a prism and a reflector, has been developed. However, since the camera module of the above-described type has a significant distance from the optical path conversion unit to an image sensor, light reflected from an inner surface of the camera module, for example, from an inner surface of a housing of the camera module and/or a shield can or shielding member of the camera module, may enter the image sensor and cause a flare phenomenon and a resolution degradation phenomenon.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect a camera module includes a housing including an opening and configured to accommodate an optical path conversion unit and a lens module; a shielding member configured to shield the opening of the housing; and a reflection reducing member disposed on an inner surface of the shielding member and configured to reduce internal reflections from the inner surface of the shielding member occurring between an end of the lens module and an image sensor.

The reflection reducing member may be a tape attached to the inner surface of the shielding member.

The reflection reducing member may include a plurality of holes.

The reflection reducing member may be a paint applied to the inner surface of the shielding member.

The reflection reducing member may include particles having a reflectance low enough to substantially prevent reflection of light.

An inner surface of the reflection reducing member may be inclined with respect to the inner surface of the shielding member.

The camera module of may further include a first driving unit configured to move the lens module in a direction of an optical axis of the lens module.

The camera module may further include a second driving unit configured to move the optical path conversion unit in a direction intersecting an optical axis of the lens module.

The camera module may further include a first movable body disposed in the housing and configured to rotate in a first direction; and a second movable body configured to receive the optical path conversion unit and rotate in a second direction intersecting the first direction.

In another general aspect, a camera module includes a housing including an opening and configured to accommodate an optical path conversion unit and a lens module; a shielding member configured to shield the opening of the housing; and a plurality of protrusions disposed on an inner surface of the shielding member and configured to reduce internal reflections from the inner surface of the shielding member occurring between an end of the lens module and an image sensor.

The camera module may further include a reflection reducing member disposed on the protrusions and the inner surface of the shielding member.

The reflection reducing member may include particles having a reflectance low enough to reduce the internal reflections.

In another general aspect, a camera module includes a housing including an opening; an optical path conversion unit disposed in the housing; an image sensor disposed in the housing or mounted on the housing; a lens module disposed in the housing between the optical path conversion unit and the image sensor and spaced apart from the image sensor; and a shielding member disposed on the housing and covering the opening of the housing, wherein the opening of the housing exposes the optical path conversion unit and the lens module to an inner surface of the shielding member, and the camera module is configured to reduce internal reflections from the inner surface of the shielding member occurring at least between the lens module and the image sensor.

The camera module may further include a reflection reducing member disposed on the inner surface of the shielding member and configured to reduce the internal reflections from the inner surface of the shielding member occurring at least between the lens module and the image sensor.

The reflection reducing member may include a tape attached to the inner surface of the shielding member, or a film attached to the inner surface of the shielding member, or a paint applied to the inner surface of the shielding member, and the tape, the film, or the paint may be configured to reduce the internal reflections from the inner surface of the shielding member occurring at least between the lens module and the image sensor.

The reflection reducing member may include a plurality of holes configured to reduce the internal reflections from the inner surface of the shielding member occurring at least between the lens module and the image sensor.

The reflection reducing member may include a plurality of particles configured to reduce the internal reflections from the inner surface of the shielding member occurring at least between the lens module and the image sensor.

The shielding member may be configured to reduce the internal reflections from the inner surface of the shielding member occurring at least between the lens module and the image sensor.

The shielding member may include a plurality of protrusions formed on the inner surface of the shielding member and configured to reduce the internal reflections from the inner surface of the shielding member occurring at least between the lens module and the image sensor, or the shielding member may include a plurality of grooves formed in the inner surface of the shielding member an configured to reduce the internal reflections from the inner surface of the shielding member occurring at least between the lens module and the image sensor.

The shielding member may include a plurality of protrusions formed on the inner surface of the shielding member, or a plurality of grooves formed in the inner surface of the shielding member, the camera module may further include a reflection reducing member disposed on the inner surface of the shielding member, and the reflection reducing member may include protrusions or grooves conforming to the protrusions or the grooves of the shielding member and configured to reduce the internal reflections from the inner surface of the shielding member occurring at least between the lens module and the image sensor.

The reflection reducing member may further include a plurality of particles configured to reduce the internal reflections from the inner surface of the shielding member occurring at least between the lens module and the image sensor.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
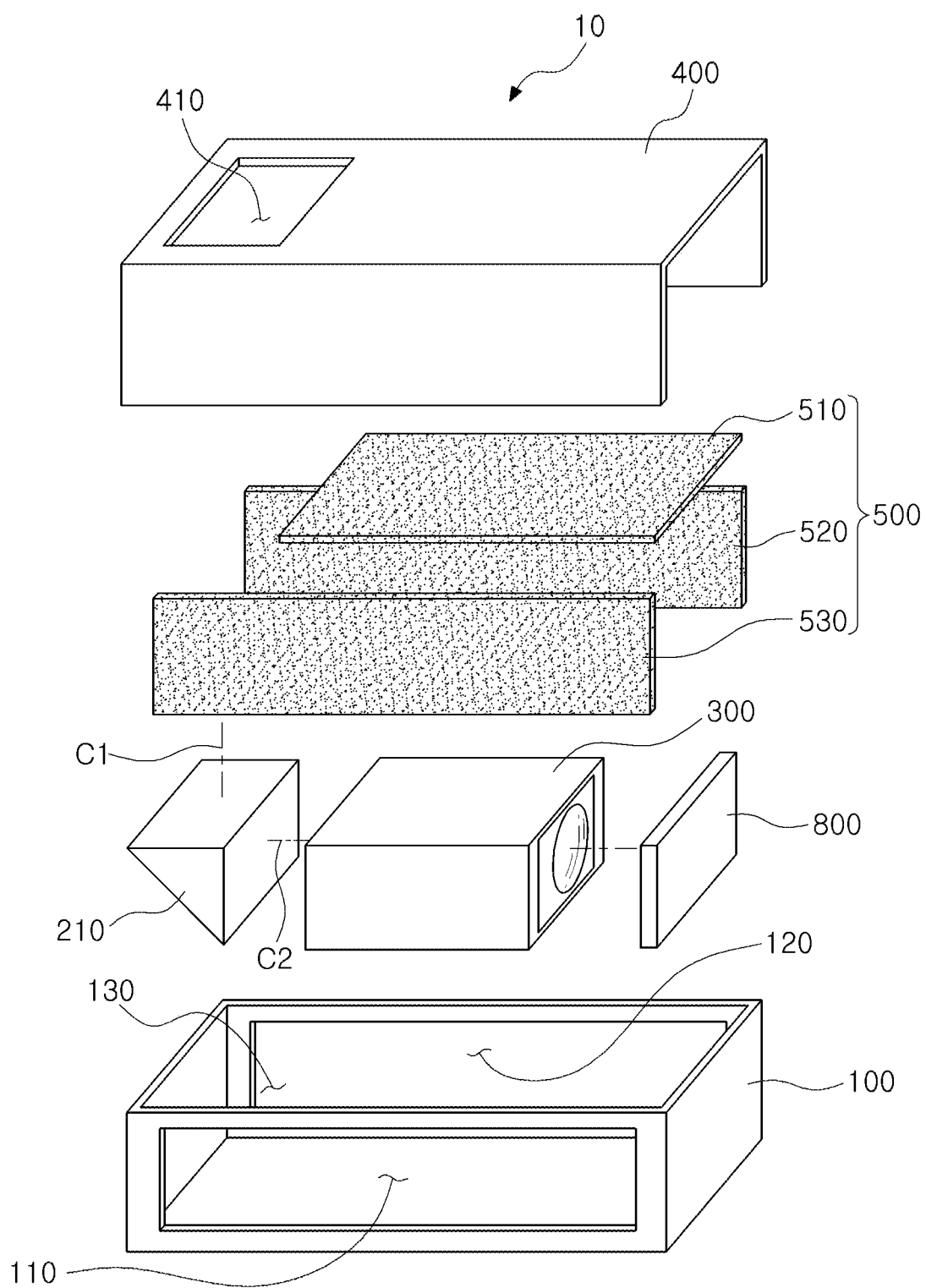
FIG. 1 is an exploded perspective view of an example of a camera module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Use herein of the word "may" in describing the various examples, e.g., as to what an example may include or implement, means that at least one example exists in which such a feature is included or implemented, but not all examples are limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various ways as will be apparent after an understanding of the disclosure of this application. Furthermore, although the examples described herein have a variety of configurations, other configurations are possible as will be apparent after an understanding of the disclosure of this application.

The camera module described herein may be mounted in a portable electronic product. For example, the camera module may be mounted in a portable telephone, a notebook computer, or any other portable electronic product capable of using a camera module. However, the range of use of the camera module is not limited to the aforementioned portable electronic products. For example, the camera module may be installed in an ATM or a television for interactive broadcasting.

Figure 2:
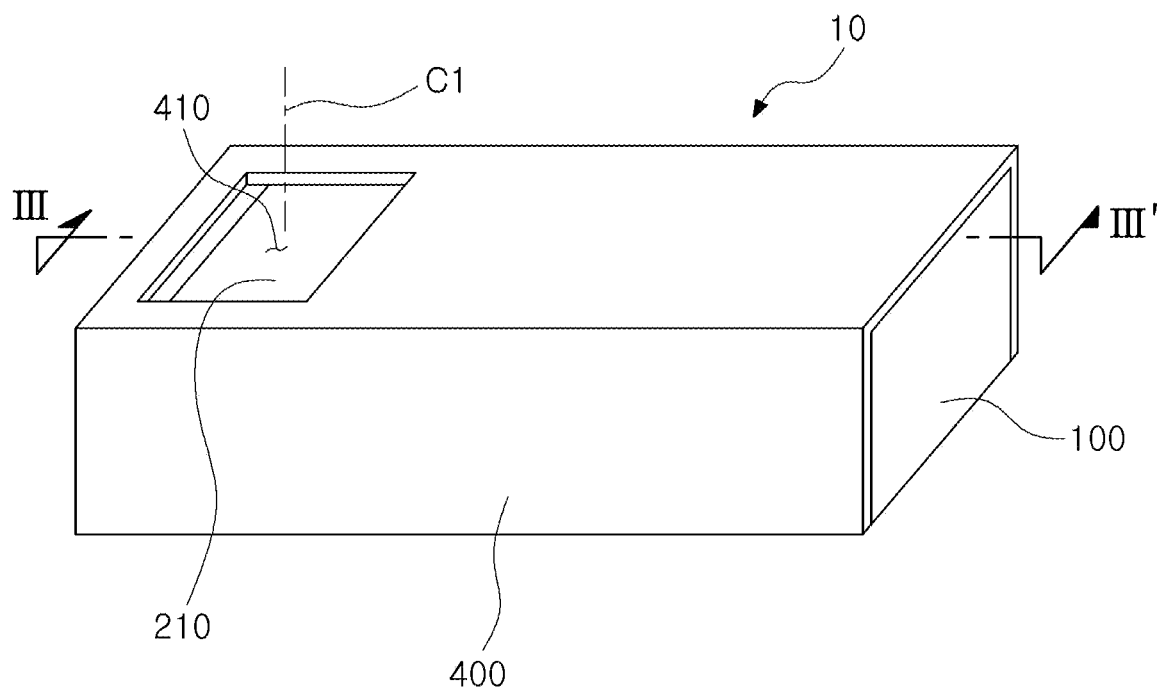
FIG. 2 is an assembled perspective view of the camera module illustrated in FIG. 1.
Figure 3:
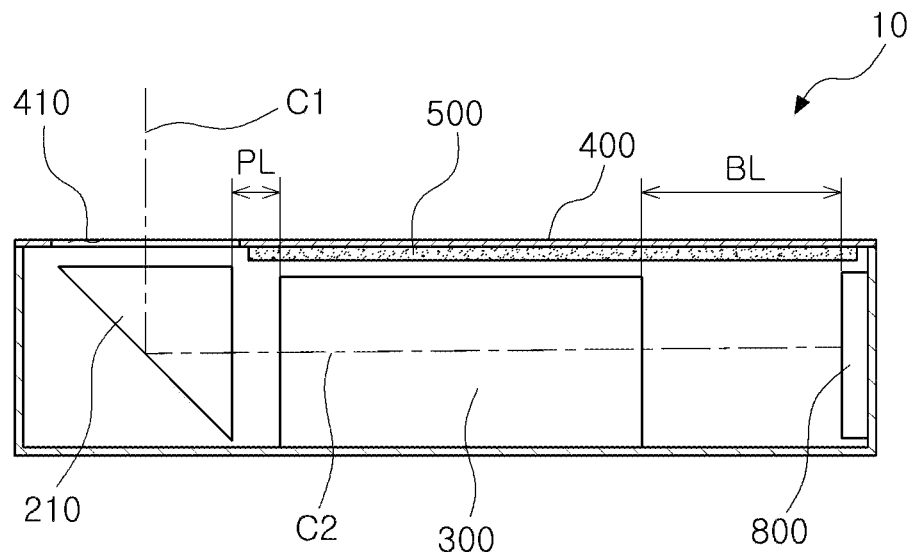
FIG. 3 is a cross-sectional view of the camera module illustrated in FIG. 2 taken along the line III-III' in FIG. 2.

FIG. 1 is an exploded perspective view of an example of a camera module, FIG. 2 is an assembled perspective view of the camera module illustrated in FIG. 1, FIG. 3 is a cross-sectional view of the camera module illustrated in FIG. 2 taken along the line III-III' in FIG. 2, and FIGS. 4A to 4C are enlarged views of examples of a portion of a reflection reducing member illustrated in FIG. 1.

Referring to FIGS. 1 to 3, a camera module 10 may include a housing 100, an optical path conversion unit 210, a lens module 300, a shielding member 400, and a reflection reducing member 500 (510, 520, and 530). However, the configuration of the camera module 10 is not limited to the aforementioned components. For example, the camera module 10 may further include an image sensor 800 and other necessary electronic components.

The housing 100 may be configured to accommodate the optical path conversion unit 210, the lens module 300, and the image sensor 800. For example, the housing 100 may be have a rectangular cuboid shape. However, the shape of the housing 100 is not limited to a rectangular cuboid shape. The housing 100 may be configured to enable mounting of and access to the optical path conversion unit 210, the lens module 300, and the image sensor 800. For example, openings 110, 120, and 130 may be formed in the right, left, and upper sides of the housing 100 to enable mounting of and access to the optical path conversion unit 210, the lens module 300, and the image sensor 800. In detail, the entire upper side of the housing 100 may be replaced by the opening 130 as illustrated in FIG. 1 to enable the optical path conversion unit 210, the lens module 300, and the image sensor 800 to be mounted in the housing 100.

The optical path conversion unit 210 may be configured to convert a path of light incident on the camera module 10. For example, the optical path conversion unit 210 may be configured to convert an optical path of light incident on the camera module 10 along a first optical axis C1 to an optical path along a second optical axis C2 intersecting the first optical axis C1. The optical path conversion unit 210 may reflect or refract the incident light to convert the optical path of the incident light. For example, the optical path conversion unit 210 may include a prism, a reflector, or any other optical component capable of reflecting or refracting light.

The lens module 300 is configured to form an optical image of the incident light refracted or reflected by the optical path conversion unit 210 on the image sensor 800. For example, the lens module 300 may refract the incident light emitted from the optical path conversion unit 210 to focus the incident light on the image sensor 800 to form an optical image on the image sensor 800.

The image sensor 800 is configured to convert the optical image formed on the image sensor 800 by the lens module 300 into an electric signal. The image sensor 800 may be manufactured in the form of a charge-coupled device (CCD), but is not limited to a CCD. One surface of the image sensor 800 may be an imaging plane on which the incident light refracted by the lens module 300 is focused to form the optical image. The image sensor 800 may be disposed so that the incident light refracted by the lens module 300 may be focused on the imaging plane to form the optical image without distortion. For example, the image sensor 800 may be disposed on one end of the housing 100 so that an optical axis of the image sensor 800 is parallel to an optical axis of the lens module 300.

The shielding member 400 may be configured to close the openings 110, 120, and 130 of the housing 100. In more detail, the shielding member 400 may be configured to completely enclose the right, left, and upper sides of the housing 100. The shielding member 400 is configured to protect the housing 100, the optical path conversion unit 210, the lens module 300, and the image sensor 800 from external impacts. For example, the shielding member 400 may be made of a metal material. However, the material of the shielding member 400 is not limited to a metal material. An opening for exposing a portion of the optical path conversion unit 210 externally may be formed in the shielding member 400. For example, an opening 410 having substantially the same size as an incident surface of the optical path conversion unit 210 may be formed in the upper side of the shielding member 400.

If the shielding member 400 is made of a metal material as described above, light may be easily reflected from an inner surface of the shielding member 400. For example, light incident into the camera module 10 through the optical path conversion unit 210 may reflected from the inner surface of the shielding member 400 and be incident on the image sensor 800 without passing through the lens module 300, or may be incident on the image sensor 800 along an optical path other than the second optical axis C2. Since light reflected from the inner surface of the shielding member 400 and incident on the image sensor 800 causes a flare phenomenon and a resolution degradation phenomenon that impair the performance of the camera module 10, internal reflections from the inner surface of the shielding member 400 need to be reduced.

The camera module 10 further includes the reflection reducing member 500 to alleviate the above-described problem. The reflection reducing member 500 is formed on the inner surface of the shielding member 400. In detail, as illustrated in FIG. 3, the reflection reducing member 500 is formed on the inner surface of the shielding member 400 at least in a section BL extending from the end of the lens module 300 to the image sensor 800, and may reduce internal reflections from the inner surface of the shielding member 400 occurring in the above-described section BL. The reflection reducing member 500 may be a tape or a film, and may be attached to the inner surface of the shielding member 400. However, the reflection reducing member 500 is not limited to a tape or a film. For example, the reflection reducing member 500 may be a paint applied to the inner surface of the shielding member 400 by coating, painting, spraying, or any other method of applying paint.

The reflection reducing member 500 may be configured to significantly reduce reflection of light. For example, the reflection reducing member 500 may be configured to have a surface roughness high enough to scatter enough light to substantially prevent reflection of light, or may include particles having a reflectance low enough to substantially prevent reflection of light. Alternatively, holes that cause diffuse reflection of light may be formed in the surface of the reflection reducing member 500.

The camera module 10 may be configured to extend lengthwise in the direction of the second optical axis C2 intersecting the first optical axis C1 as illustrated in FIGS. 1 and 3. The camera module 10 may be configured to capture an image of a subject located at a relatively long distance from the camera module 10. For example, the distance BL from the end of the lens module 300 to the image sensor 800 may be a relatively long distance. In detail, the distance BL from the end of the lens module 300 to the image sensor 800 may be greater than a distance PL from an exit surface of the optical path conversion unit 210 to the front of the lens module 300 as illustrated in FIG. 3.

The camera module 10 is configured to reduce reflections from the inner surface of the shielding member 400. For example, the camera module 10 may reduce reflection of light from the inner surface of the shielding member 400 through the reflection reducing member 500. The reflection reducing member 500 may reduce internal reflections occurring in at least one specific section of the shielding member 400. For example, the reflection reducing member 500 may reduce internal reflections occurring in a section from the exit surface of the optical path conversion unit 210 to the front of the lens module 300 and in a section from the end of the lens module 300 to the image sensor 800. However, the reduction of internal reflections by the reflection reducing member 500 is not limited to the above-described sections. For example, the reflection reducing member 500 may also reduce reflection of light occurring between the side surface of the lens module 300 and the inner surface of the shielding member 400.

Figure 4A:
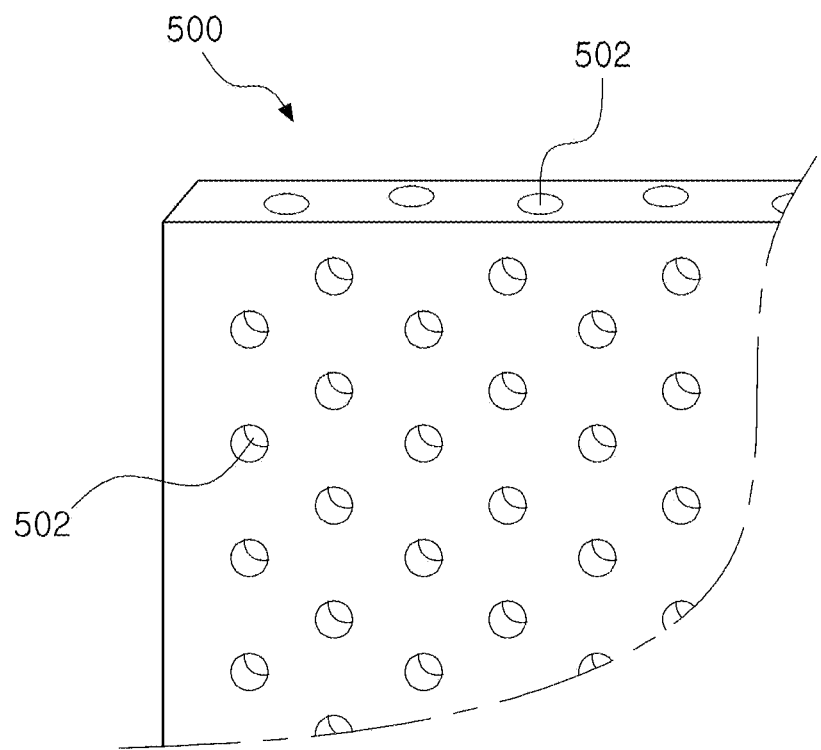
FIGS. 4A to 4C are enlarged views of examples of a portion of a reflection reducing member illustrated in FIG. 1.
Figure 4B:
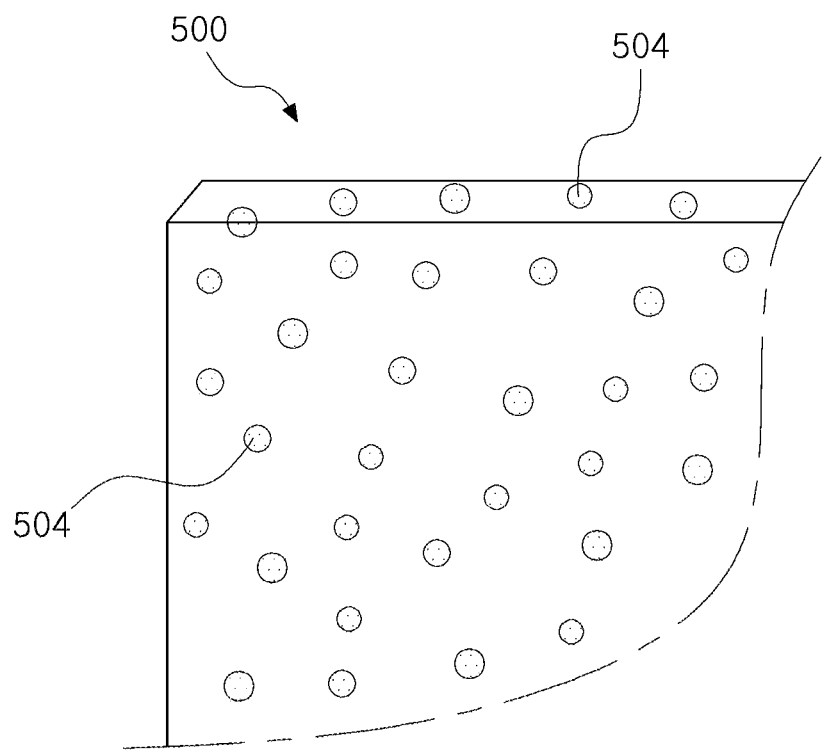
Figure 4C:
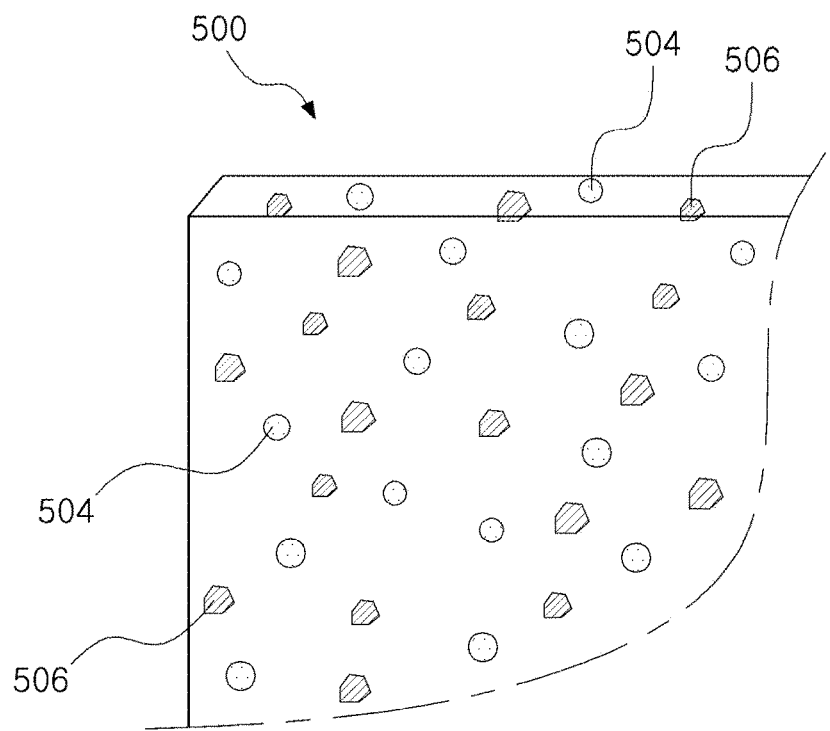

The reflection reducing member 500 may be configured to scatter or absorb light. For example, as illustrated in FIG. 4A, a plurality of holes 502 may be formed in the reflection reducing member 500 to absorb or scatter light incident on or reflected from the inner surface of the shielding member 400. Alternatively, the reflection reducing member 500 may include a plurality of particles 504 to absorb or scatter light as illustrated in FIG. 4B. The particles 504 of the reflection reducing member 500 may be a material that absorbs light or has a reflectance low enough to substantially prevent reflection of light. Alternatively, the reflection reducing member 500 may include particles 504 and 506 having different sizes and/or of different types as illustrated in FIG. 4C to absorb or scatter light. The particles 504 and 506 of the reflection reducing member 500 may be materials that absorb light or have reflectances low enough to substantially prevent reflection of light. In addition, the particles 504 and 506 may have different reflectances or different sizes. Alternatively, the reflection reducing member may have any one or any combination of any two or more of the forms illustrated in FIGS. 4A to 4C.

Since the camera module 10 configured as above may reduce the reflection of light from the inner surface of the shielding member 400 or the reflection of light occurring between the lens module 300 and the inner surface of the shielding member 400, a flare phenomenon and a resolution degradation phenomenon caused by the reflection of light may be significantly reduced.

Figure 5:
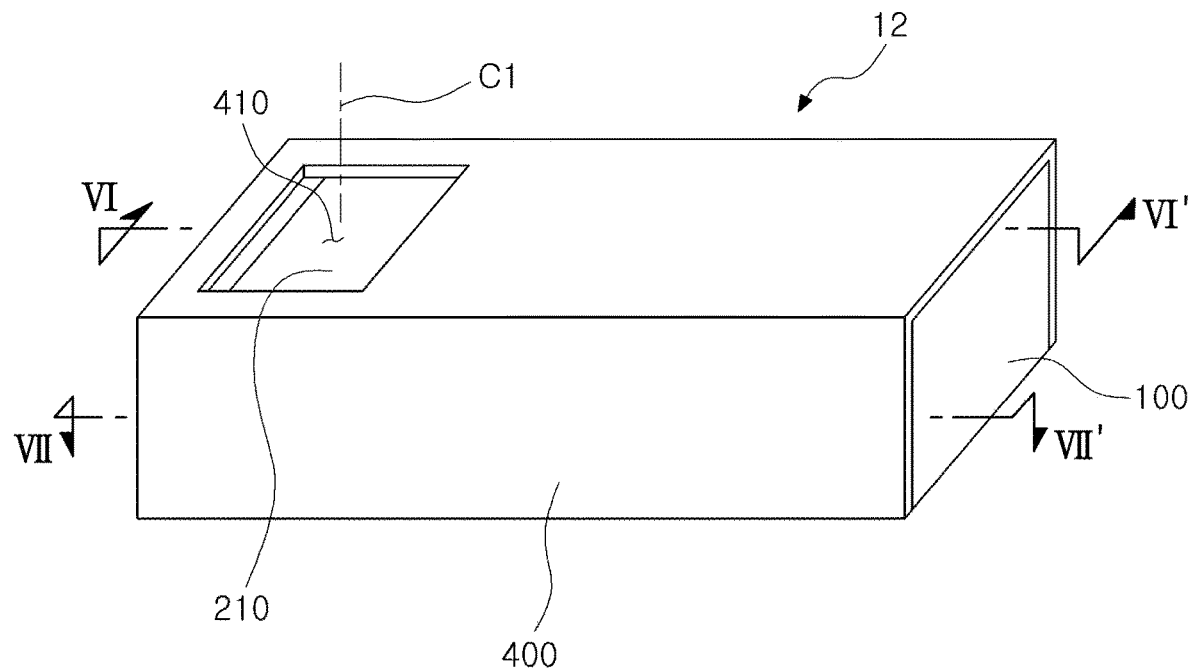
FIG. 5 is a perspective view of another example of a camera module.
Figure 6:
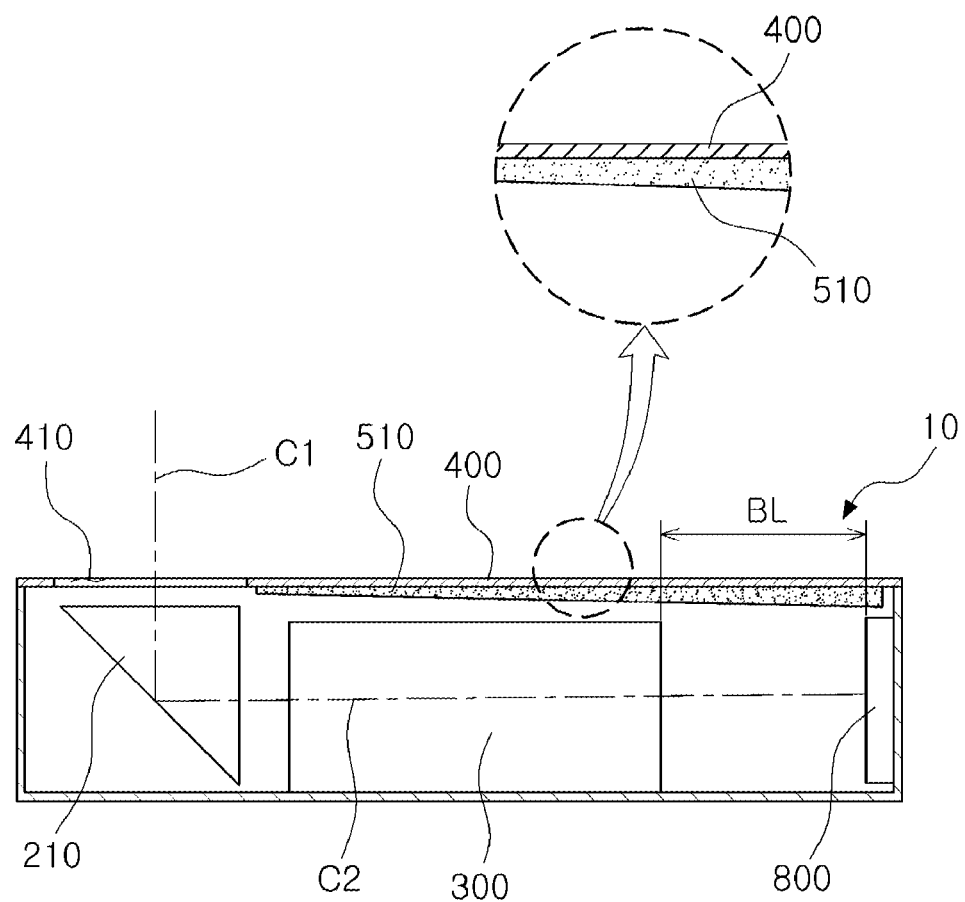
FIG. 6 is a cross-sectional view of the camera module illustrated in FIG. 5 taken along the line VI-VI' in FIG. 5 illustrating an increased thickness of the reflection reducing member closer to the image sensor.
Figure 7:
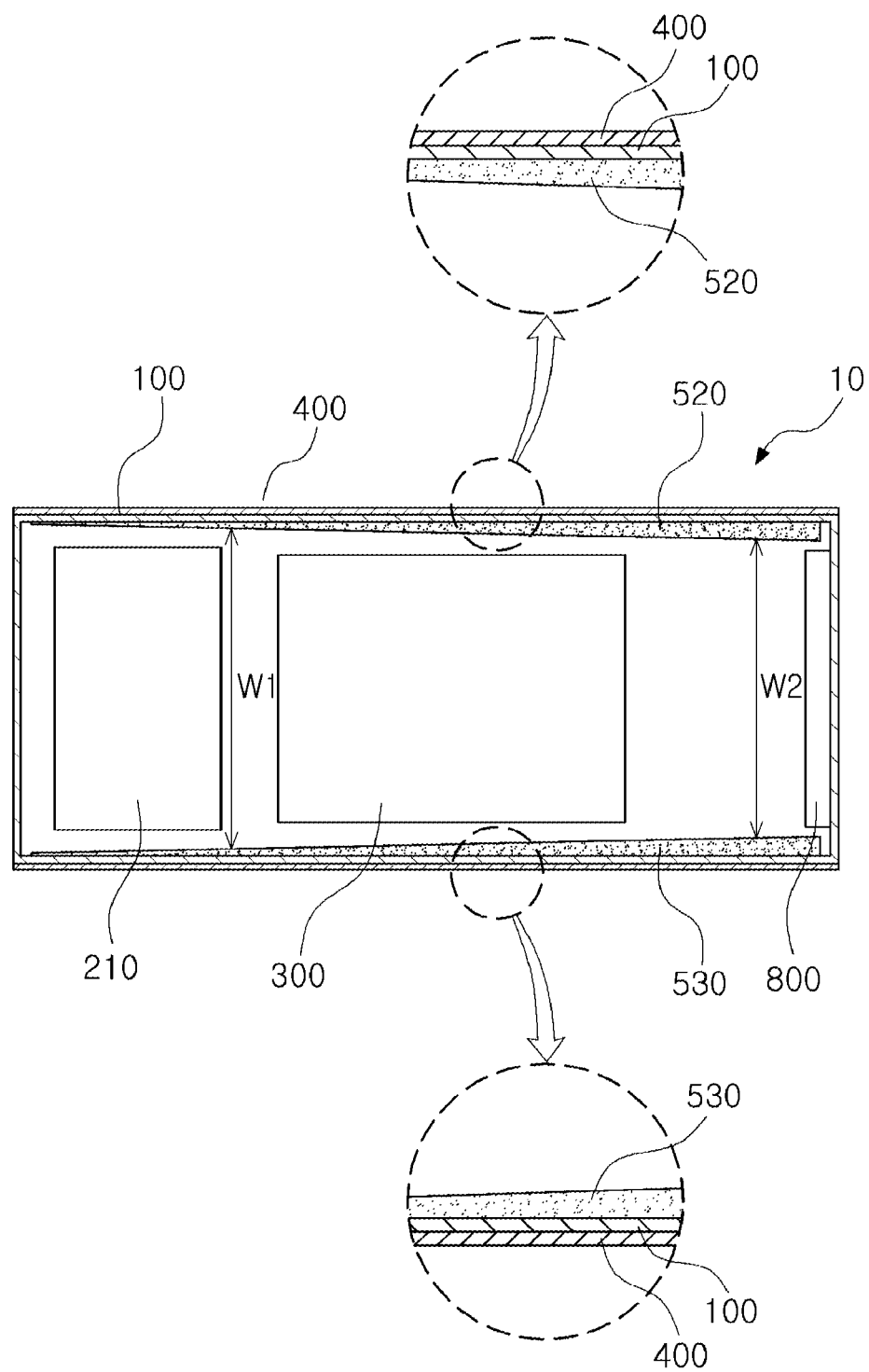
FIG. 7 is a cross-sectional view of the camera module illustrated in FIG. 5 taken along the line VII-VII' in FIG. 5 illustrating an increased thickness of the reflection reducing members closer to the image sensor.

FIG. 5 is a perspective view of another example of a camera module, FIG. 6 is a cross-sectional view of the camera module illustrated in FIG. 5 taken along the line VI-VI' in FIG. 5, and FIG. 7 is a cross-sectional view of the camera module illustrated in FIG. 5 taken along the line VII-VII' in FIG. 5.

Referring to FIG. 5, a camera module 12 may include a housing 100, an optical path conversion unit 210, a lens module 300, a shielding member 400, and a reflection reducing member 500. However, the configuration of the camera module 12 is not limited to the aforementioned components. For example, the camera module 12 may further include an image sensor 800 and other necessary electronic components.

The housing 100 may be configured to accommodate the optical path conversion unit 210, the lens module 300, and the image sensor 800. The housing 100 may be have the same shape or a similar shape as the housing 100 of the camera module 10 illustrated in FIG. 1-3. For example, the housing 100 may have a rectangular cuboid shape. However, the shape of the housing 100 is not limited to a rectangular cuboid shape. The housing 100 may be configured to enable mounting of and access to the optical path conversion unit 210, the lens module 300, and the image sensor 800. For example, as illustrated in FIG. 1, openings 110, 120, and 130 may be formed in the right, left, and upper sides of the housing 100 to enable mounting of and access to the optical path conversion unit 210, the lens module 300, and the image sensor 800. In detail, the entire upper side of the housing 100 may be replaced by the opening 130 to enable the optical path conversion unit 210, the lens module 300, and the image sensor 800 to be mounted in the housing 100.

The optical path conversion unit 210 may be configured to convert a path of light incident on the camera module 12. For example, the optical path conversion unit 210 may be configured to convert an optical path of light incident on the camera module 12 along the first optical axis C1 to an optical path along the second optical axis C2 intersecting the first optical axis C1. The optical path conversion unit 210 may reflect or refract the incident light to convert the optical path of the incident light. For example, the optical path conversion unit 210 may a prism, a reflector, or any other optical component capable of reflecting or refracting light.

The lens module 300 is configured to form an image of the incident light refracted or reflected by the optical path conversion unit 210 on the image sensor 800. For example, the lens module 300 may refract the incident light emitted from the optical path conversion unit 210 to focus the incident light on the image sensor 800 to form an optical image on the image sensor 800.

The image sensor 800 is configured to convert the optical image formed on the image sensor 800 by the lens module 300 into an electric signal. The image sensor 800 may be manufactured in the form of a CCD, but is not limited to a CCD. One surface of the image sensor 800 may be an imaging plane on which the incident light refracted by the lens module 300 is focused to form the optical image. The image sensor 800 may be disposed so that the incident light refracted by the lens module 300 may be focused on the image sensor 800 to form the optical image without distortion. For example, the image sensor 800 may be disposed on one end the housing 100 so that an optical axis of the image sensor 800 is parallel to an optical axis of the lens module 300.

The shielding member 400 may be configured to close openings of the housing 100. The shielding member 400 is configured to protect the housing 100, the optical path conversion unit 210, the lens module 300, and the image sensor 800 from external impacts. For example, the shielding member 400 may be made of a metal material. However, the material of the shielding member 400 is not limited to a metal material. An opening 410 for exposing a portion of the optical path conversion unit 210 externally may be formed in the shielding member 400. For example, an opening 410 having substantially the same size as an incident surface of the optical path conversion unit 210 may be formed in the upper side of the shielding member 400.

If the shielding member 400 is made of a metal material as described above, light may be easily reflected from an inner surface of the shielding member 400. For example, light incident into the camera module 12 through the optical path conversion unit 210 may be reflected from the inner surface of the shielding member 400 and be incident on the image sensor 800 without passing through the lens module 300, or may be incident on the image sensor 800 along an optical path other than the second optical axis C2. Since light reflected from the inner surface of the shielding member 400 and incident on the image sensor 800 causes a flare phenomenon and a resolution degradation phenomenon that impair the performance of the camera module 12, internal reflections from the inner surface of the shielding member 400 need to be reduced.

The camera module 12 includes the reflection reducing member 500 to alleviate the above-described problem. For example, the reflection reducing member 500 may be formed on the inner surface of the shielding member 400 to reduce a flare phenomenon and a resolution degradation phenomenon caused by the internal reflections from the inner surface of the shielding member 400. The reflection reducing member 500 may be formed on only a portion the inner surface of the shielding member 400. For example, the reflection reducing member 500 may be formed on the inner surface of the shielding member 400 at least in a section BL extending from the end of the lens module 300 to the image sensor 800. The formation position of the reflection reducing member 500 is not limited to the inner surface of the shielding member 400. For example, the reflection reducing member 500 may be formed to cover an openings of the housing 100. The reflection reducing member 500 may be a tape or a film, and may be attached to the inner surface of the shielding member 400. However, the reflection reducing member 500 is not limited to a tape or a film. For example, the reflection reducing member 500 may be a paint applied to the inner surface of the shielding member 400 by coating, painting, spraying, or any other method of applying paint.

The reflection reducing member 500 may be configured to scatter or absorb light. For example, the reflection reducing member 500 may have any one or any combination of any two or more of the forms illustrated in FIGS. 4A to 4C.

Figure 8:
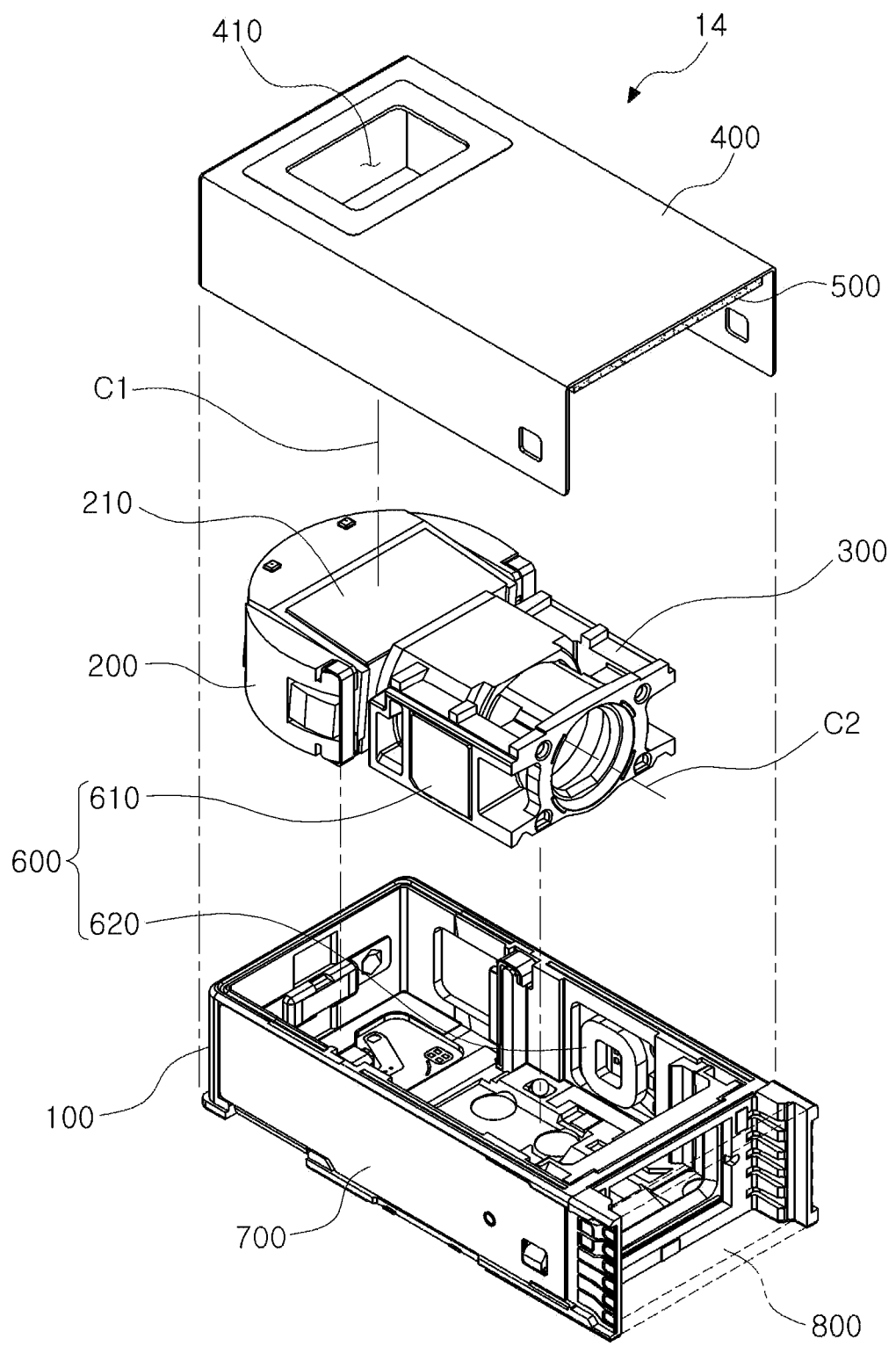
FIG. 8 is an exploded perspective view of another example of a camera module.
Figure 9:
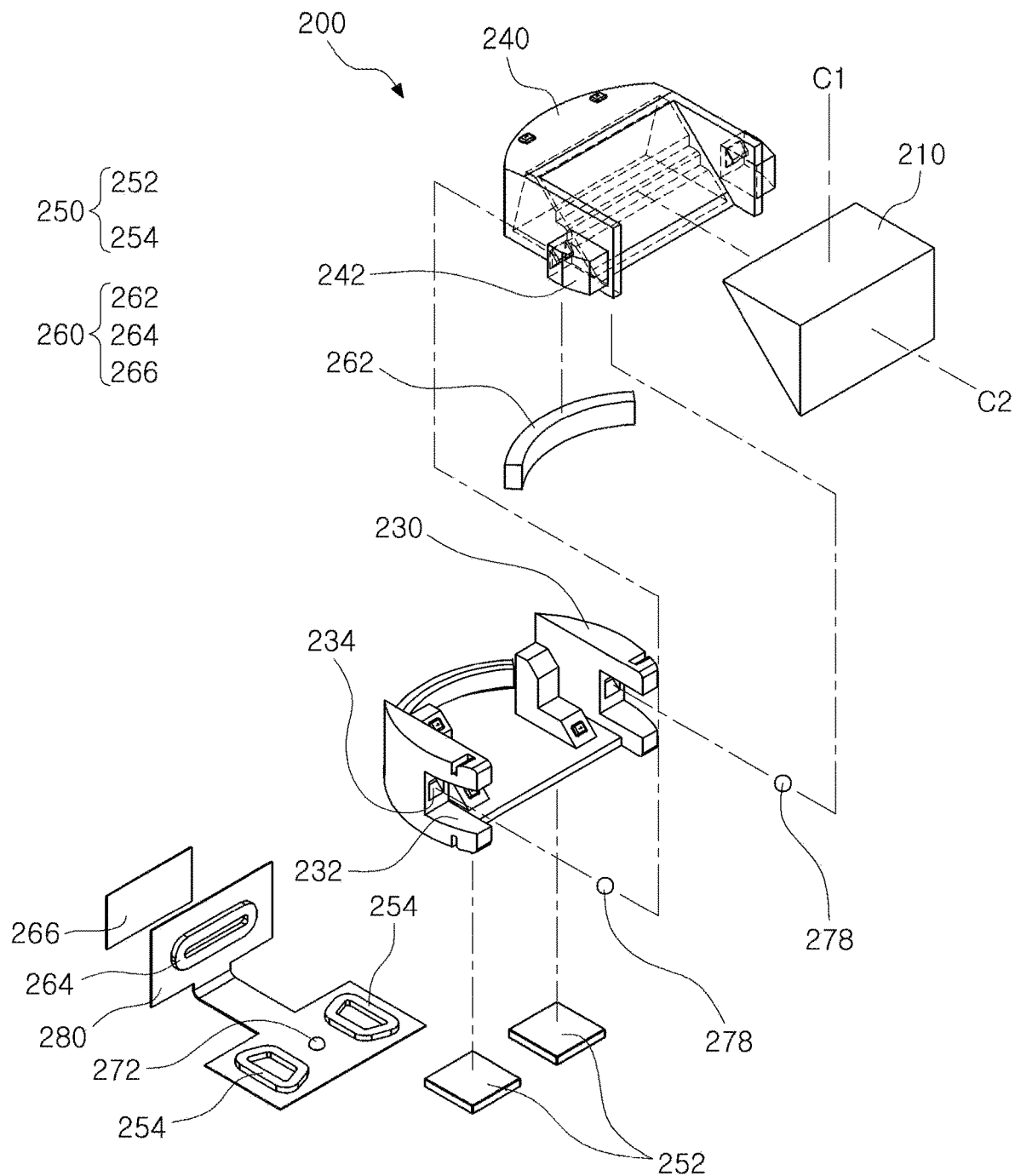
FIG. 9 is an exploded perspective view of an optical path conversion module illustrated in FIG. 8.
Figure 10A:
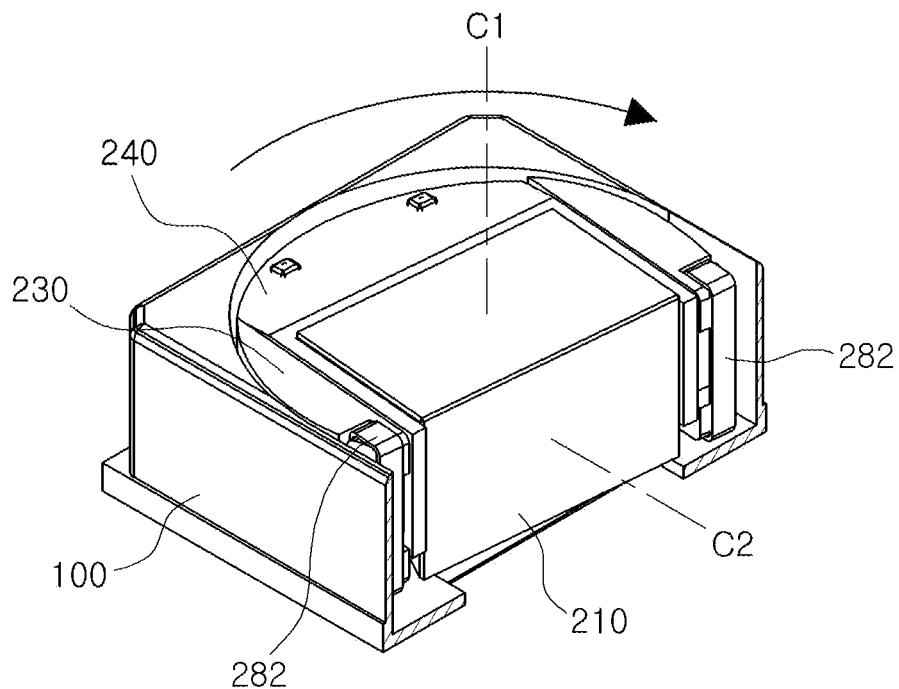
FIG. 10A is a perspective view illustrating how a first movable body of the optical path conversion module illustrated in FIG. 9 rotates in a horizontal direction.
Figure 10B:
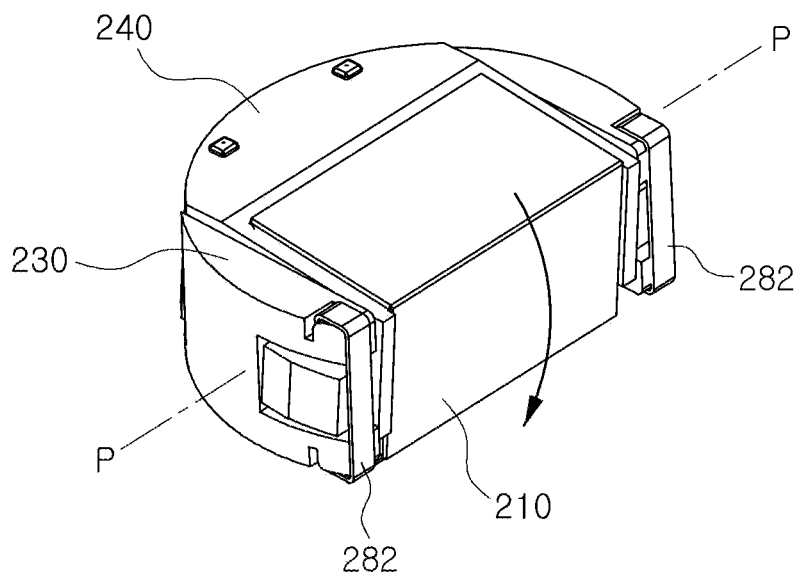
FIG. 10B is a perspective view illustrating how a second movable body of the optical path conversion module illustrated in FIG. 9 rotates in a vertical direction.

FIG. 8 is an exploded perspective view of another example of a camera module, FIG. 9 is an exploded perspective view of an optical path conversion module illustrated in FIG. 8, FIG. 10A is a perspective view illustrating how a first movable body of the optical path conversion module illustrated in FIG. 9 rotates in a horizontal direction, and FIG. 10B is a perspective view illustrating how a second movable body of the optical path conversion module illustrated in FIG. 9 rotates in a vertical direction.

Referring to FIG. 8, camera module 14 may include a housing 100, an optical path conversion module 200, a lens module 300, a shielding member 400, and a reflection reducing member 500. In addition, the camera module 14 may further include a first driving unit 600, a printed circuit board (PCB) 700, and an image sensor 800.

The housing 100 may be configured to accommodate the optical path conversion module 200, the lens module 300, the first driving unit 600, and the image sensor 800. For example, the housing 100 may have a rectangular cuboid shape. However, the shape of the housing 100 is not limited to the rectangular cuboid shape. At least one surface of the housing 100 may have an opening. For example, the upper side of the housing 100 may be replaced by an opening to enable the optical path conversion module 200 and the lens module 300 to be mounted in the housing 100, and an opening may be formed in one end of the housing 100 to enable the image sensor 800 to be mounted in the housing 100. Other openings may be formed in the other end and the right and left sides of the housing 100 to enable access to the optical path conversion module 200, the lens module 300, and the first driving unit 600. The PCB 700 may be disposed on the other end and the right and left sides of the housing, and may be a flexible PCB.

The optical path conversion module 200 is configured to change an optical path of light incident on the optical path conversion module 200. For example, the optical path conversion module 200 may refract or reflect light incident on the optical path conversion module 200 along the first optical axis C1 in the direction of the second optical axis C2 intersecting the first optical axis C1.

The lens module 300 is configured to form an optical image of the incident light refracted or reflected by the optical path conversion module 200 on the image sensor 800. For example, the lens module 300 may refract the incident light emitted from the optical path conversion module 200 to focus the incident light on the image sensor 800 to form an optical image on the image sensor 800.

The image sensor 800 is configured to convert the optical image formed on the image sensor 800 by the lens module 300 into an electric signal. The image sensor 800 may be manufactured in the form of a CCD, but is not limited to a CCD. One surface of the image sensor 800 may be an imaging plane on which the incident light refracted by the lens module 300 is focused to form the optical image. The image sensor 800 may be disposed so that the incident light refracted by the lens module 300 may be focused on the imaging plane to form the optical image without distortion. For example, the image sensor 800 may be disposed on one end of the housing 100 so that an optical axis of the image sensor is parallel to an optical axis of the lens module 300.

The shielding member 400 may be configured to close openings of the housing 100. The shielding member 400 is configured to protect the housing 100, the optical path conversion module 200, the lens module 300, and the image sensor 800 from external impacts. For example, the shielding member 400 may be made of a metal material. However, the material of the shielding member 400 is not limited to a metal material. An opening for exposing a portion of the optical path conversion module 200 externally may be formed in the shielding member 400. For example, an opening 410 having substantially the same size as an incident surface of an optical path conversion unit 210 of the optical path conversion module 200 may be formed in the upper side of the shielding member 400.

If the shielding member 400 is made of a metal material as described above, light may be easily reflected from an inner surface of the shielding member 400. For example, light incident into the camera module 10 through the optical path conversion module 200 may be reflected from the inner surface of the shielding member 400 and be incident on the image sensor 800 without passing through the lens module 300, or may be incident on the image sensor 800 along an optical path other than the second optical axis C2. Since light reflected from the inner surface of the shielding member 400 and incident on the image sensor 800 causes a flare phenomenon and a resolution degradation phenomenon that impair the performance of the camera module 14, internal reflections from the inner surface of the shielding member 400 need to be reduced.

The reflection reducing member 500 is configured to prevent the above-described problem. For example, the reflection reducing member 500 is formed on the inner surface of the shielding member 400. However, the formation position of the reflection reducing member 500 is not limited to the inner surface of the shielding member 400. For example, the reflection reducing member 500 may be formed to cover one or more openings of the housing 100. The reflection reducing member 500 may be a tape or a film, and may be attached to the inner surface of the shielding member 400. However, the reflection reducing member 500 is not limited to tape or a film. For example, the reflection reducing member 500 may be a paint applied to the inner surface of the shielding member 400 by coating, painting, spraying, or another method of applying paint.

The reflection reducing member 500 may be configured to scatter or absorb light. For example, the reflection reducing member 500 may have any one or any combination of any two or more of the forms illustrated in FIGS. 4A to 4C.

The first driving unit 600 may be configured to move the lens module 300. For example, the first driving unit 600 may move the lens module 300 in the direction of the second optical axis C2 to perform autofocusing of the camera module 14. The first driving unit 600 may include a first driving magnet 610 and a first driving coil 620. However, the configuration of the first driving unit 600 is not limited to the first driving magnet 610 and the first driving coil 620. The first driving magnet 610 may be disposed on the lens module 300, and the first driving coil 620 may be disposed on the PCB 700. The first driving unit 600 may include another first driving magnet 610 not visible in FIG. 8 that is disposed on an opposite side of the lens module 300 from the first driving magnet 610 illustrated in FIG. 8, and another first driving coil 620 not visible in FIG. 8 that is disposed on the PCB 700 on an opposite side of the housing 100 from the first driving coil 620 illustrated in FIG. 8. The first driving magnets 610 are disposed to substantially face corresponding ones of the first driving coils 620 so that a magnetic force for driving the lens module 300 may be generated.

Referring to FIG. 9, the optical path conversion module 200 may include an optical path conversion unit 210, a first movable body 230, and a second movable body 240. In addition, the optical path conversion module 200 may further include components for driving the optical path conversion unit 210. For example, the optical path conversion module 200 may further include second driving units 250 and 260, bearings 272 and 278, and a substrate member 280. The substrate member may be disposed on the housing 100.

The first movable body 230 is configured to support the second movable body 240. For example, receiving portions 232 for accommodating protrusions 242 of the second movable body 240 may be formed on both sides of the first movable body 230. The receiving portions 232 may be formed to limit a coupling direction of the second movable body 240. For example, the receiving portions 232 may have an open front so that the second movable body 240 may be coupled to the first movable body 230 through the front of the first movable body 230. The receiving portions 232 may include components enabling the second movable body 240 to rotate in the vertical direction with respect to the first movable body 230. For example, bearings 278 enabling the second movable body to rotate in the vertical direction may be disposed in recesses 234 formed in the receiving portions 232. Components for preventing separation of the second movable body 240 from the first movable body 230 may be coupled to the receiving portions 232. For example, clips 282 for preventing the protrusions 242 from separating from the receiving portions 232 may be fitted to each of the receiving portions 232 as illustrated in FIGS. 10A and 10B.

Thus, the second movable body 240 may be disposed on the first movable body 230 so that the second movable body 240 is rotatable in the vertical direction. For example, the second movable body 240 may rotate in the vertical direction on the bearings 278 disposed between the receiving portions 232 of the first movable body 230 and the protrusions 242 of the second movable body 240.

The second movable body 240 may be configured to support the optical path conversion unit 210. For example, a portion of the second movable body 240 may be inclined to support the reflective surface of the optical path conversion unit 210.

The camera module 14 may include the second driving units 250 and 260 for driving the optical path conversion module 200. The second driving units 250 and 260 may include second driving magnets 252 and 262 and second driving coils 254 and 264. The second driving magnets 252 may be disposed on the bottom surface of the first movable body 230, and the second driving magnet 262 may be disposed on the rear surface of the second movable body 240. In addition, the second driving coils 254 and 264 may be disposed on the substrate member 280 disposed on the housing 100. The second driving unit 260 may further include a yoke 266 disposed on an opposite surface of the substrate member 280 from the second driving coil 264 and generating an attractive force in the direction of the second optical axis C2 in cooperation with the second driving magnet 262. The yoke 266 may be made of a ferromagnetic material or any other material capable of generating an attractive force in cooperation with the second driving magnet 262. The second driving unit 250 rotates the first movable body 230 of the optical path conversion module 200 in the horizontal direction around the first optical axis C1 as illustrated in FIG. 10A, and the second driving unit 260 rotates the second movable body 240 of the optical path conversion module 200 in the vertical direction around a virtual axis P as illustrated in FIG. 10B.

The camera module 14 configured as described above may suppress a flare phenomenon and a resolution degradation phenomenon caused by internal reflections through the reflection reducing member 400. In addition, the camera module 14 may adjust the focus of the lens module 300 through the first driving unit 600. In addition, the camera module 14 may align an optical axis of the optical path conversion module 200 with an optical axis of the lens module 300 through the second driving units 250 and 260.

Figure 11:
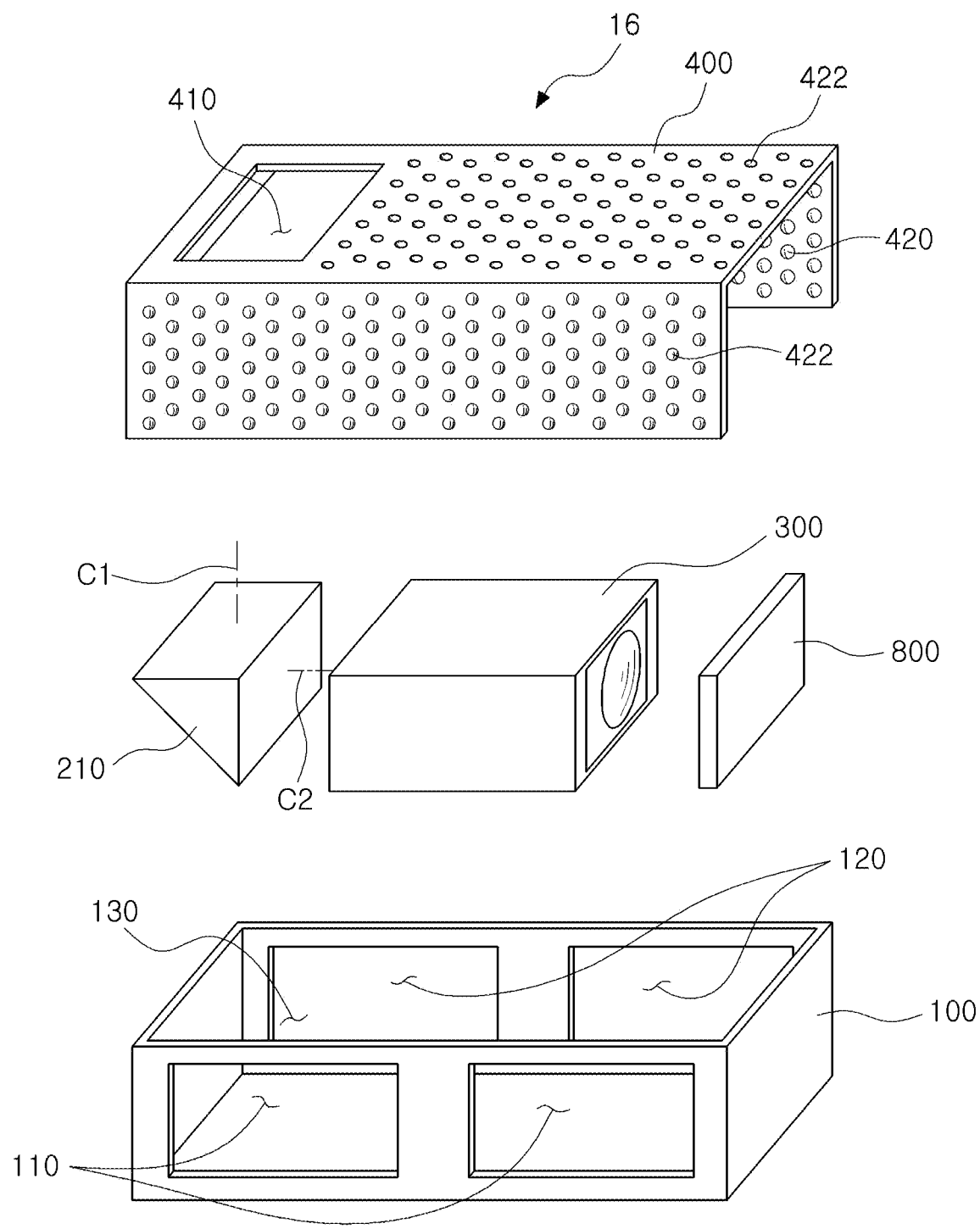
FIG. 11 is an exploded perspective view of another example of a camera module.
Figure 12:
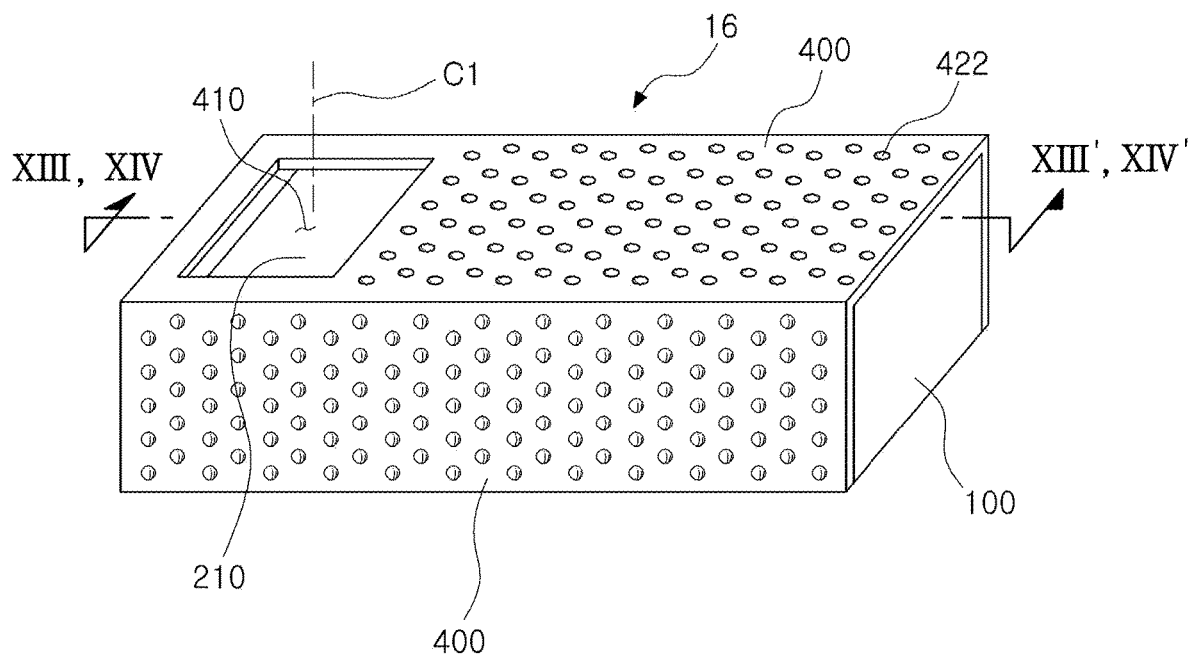
FIG. 12 is an assembled perspective view of the camera module illustrated in FIG. 11.
Figure 13:
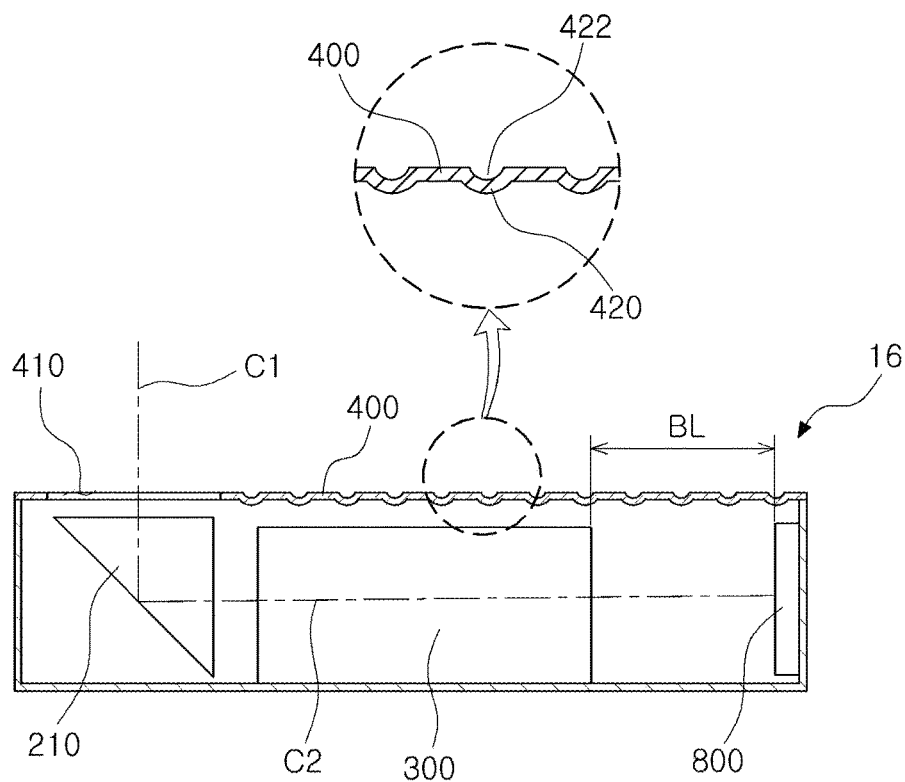
FIG. 13 is a cross-sectional view of the camera module illustrated in FIG. 12 taken along the line XIII-XIII' in FIG. 12.
Figure 14:
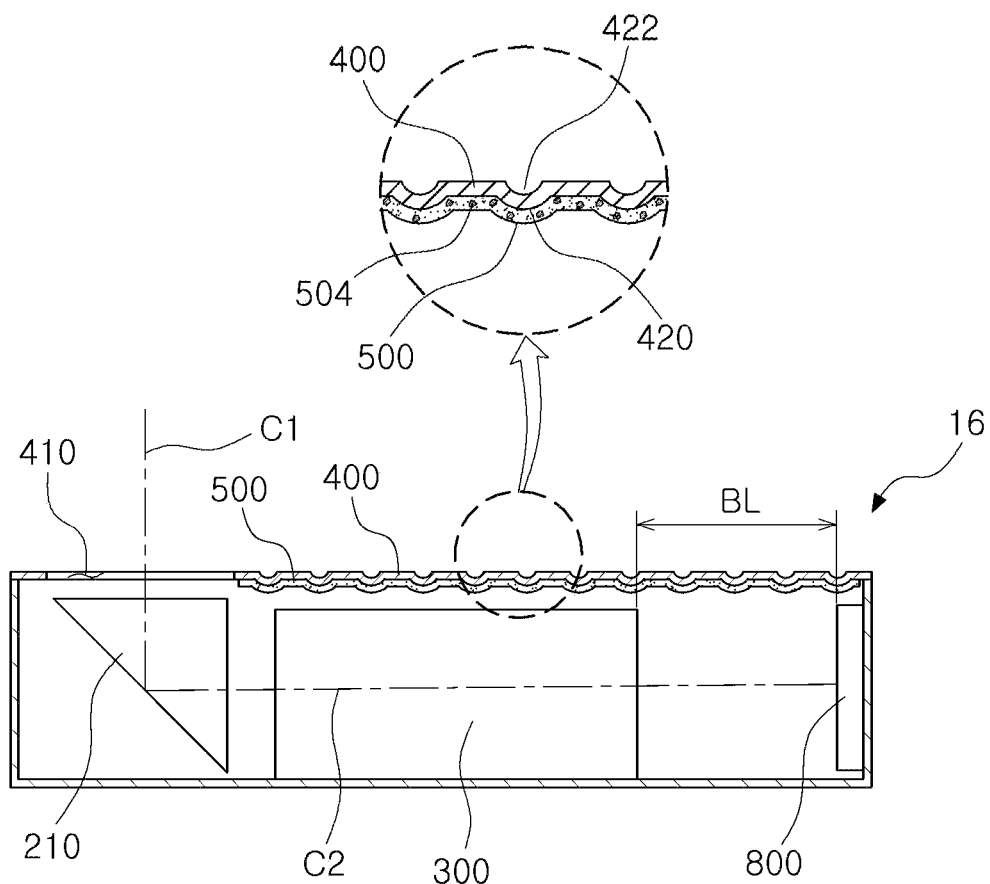
FIG. 14 is a cross-sectional view of a modified example of the camera module illustrated in FIG. 12 taken along the line XIV-XIV' in FIG. 12.

FIG. 11 is an exploded perspective view of another example of a camera module, FIG. 12 is an assembled perspective view of the camera module illustrated in FIG. 11, FIG. 13 is a cross-sectional view of the camera module illustrated in FIG. 12 taken along the line XIII-XIII' in FIG. 12, and FIG. 14 is a cross-sectional view of a modified example of the camera module illustrated in FIG. 12 taken along the line XIV-XIV' in FIG. 12.

Referring to FIG. 11, camera module 16 may include a housing 100, an optical path conversion unit 210, a lens module 300, and a shielding member 400. However, the configuration of the camera module 16 is not limited to the aforementioned components. For example, the camera module 16 may further include an image sensor 800 and other necessary electronic components.

The housing 100 may be configured to accommodate the optical path conversion unit 210, the lens module 300, and the image sensor 800. The housing 100 may have the same shape or a similar shape as the housing 100 of the camera module 10 illustrated in FIGS. 1 to 3. For example, the housing 100 may have a rectangular cuboid shape. However, the shape of the housing 100 is not limited to a rectangular cuboid shape. The housing 100 may be configured to enable mounting of and access to the optical path conversion unit 210, the lens module 300, and the image sensor 800. For example, openings 110, 120, and 130 may be formed in the right, left, and upper sides of the housing 100 to enable mounting of and access to the optical path conversion unit 210, the lens module 300, and the image sensor 800. In detail, the entire upper side of the housing 100 may be replaced by the opening 130 to enable the optical path conversion unit 210, the lens module 300, and the image sensor 800 may be mounted in the housing 100.

The optical path conversion unit 210 may be configured to convert an optical path of light incident on the camera module 16. For example, the optical path conversion unit 210 may be configured to convert an optical path of light incident on the camera module 16 along the first optical axis C1 to an optical path along the second optical axis C2 intersecting the first optical axis C1. The optical path conversion unit 210 may reflect or refract the incident light to convert the optical path of the incident light. For example, the optical path conversion unit 210 may include a prism, a reflector, or any other optical component capable of reflecting or refracting light.

The lens module 300 is configured to form an optical image of the incident light refracted or reflected by the optical path conversion unit 210 on the image sensor 800. For example, the lens module 300 may refract the incident light emitted from the optical path conversion unit 210 to focus the incident light on the image sensor 800 to form an optical image on the image sensor 800.

The image sensor 800 is configured to convert the optical image formed on the image sensor 800 by the lens module 300 into an electric signal. The image sensor 800 may be manufactured in the form of a CCD, but is not limited to a CCD. One surface of the image sensor 800 may be an imaging plane on which the incident light refracted by the lens module 300 is focused to form the optical image. The image sensor 800 may be disposed so that the incident light refracted by the lens module 300 may be focused on the imaging plane to form the optical image without distortion. For example, the image sensor 800 may be disposed on end side of the housing 100 so that an optical axis of the image sensor 800 is parallel to an optical axis of the lens module 300.

The shielding member 400 may be configured to close the openings 110, 120, and 130 of the housing 100. The shielding member 400 is configured to protect the housing 100, the optical path conversion unit 210, the lens module 300, and the image sensor 800 from external impacts. For example, the shielding member 400 may be made of a metal material. However, the material of the shielding member 400 is not limited to a metal material. An opening for exposing a portion of the optical path conversion unit 210 externally may be formed in the shielding member 400. For example, an opening 410 having substantially the same size as an incident surface of the optical path conversion unit 210 may be formed in the upper side of the shielding member 400.

The shielding member 400 may be configured to prevent internal reflections. For example, a plurality of protrusions 420 may be formed on the shielding member 400, and a plurality of grooves 422 may be formed in the shielding member 400. As illustrated in FIG. 13, the protrusions 420 may be formed on an inner surface of the shielding member 400, and the grooves 422 may be formed in an outer surface of the shielding member 400. However, the protrusions 420 and the grooves 422 are not limited to the above-described positions. For example, the protrusions 420 may be formed on the outer surface of the shielding member 400, and the grooves 422 may be formed in the inner surface of the shielding member 400. The protrusions 420 and the grooves 422 may be formed on and in only a portion of the shielding member 400. For example, the protrusions 420 and the grooves 422 may be formed on and in only a portion of the shielding member 400 extending from the end of the lens module 300 to the image sensor.

The protrusions 420 and the grooves 422 may be formed by press working the shielding member 400. However, the method of forming the protrusions 420 and the grooves 422 is not limited to press working. The protrusions 420 and the grooves 422 may reduce a flare phenomenon. For example, the protrusions 420 and the grooves 422 may scatter light incident on the inner surface of the shielding member 400 so that the light incident on the inner surface of the shielding member 400 is not reflected to the image sensor 800. In detail, the protrusions 420 and the grooves 422 may reduce internal reflections of light from the inner surface of the shielding member 400 at least between the end of the lens module 300 and the image sensor 800.

As illustrated in FIG. 14, the camera module 16 may further include a reflection reducing member 500 to improve the scattering effect of light by the protrusions 420 and the grooves 422. The reflection reducing member 500 is formed on the inner surface of the shielding member 400 and may include particles 504 that scatter or absorb light.

Since the camera module 16 configured as described above may reduce the flare phenomenon through the shielding member 400, the manufacturing process of the camera module 16 may be simplified and manufacturing costs of the camera module 16 may be reduced.

As described above, the examples of a camera module described above reduce a flare phenomenon caused by internal reflections from the inner surface of a shielding member.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a housing comprising an opening and configured to accommodate an optical path conversion unit and a lens module;
   a shielding member configured to shield the opening of the housing, the shielding member including a section that extends between an exit surface of the optical path conversion unit and a front of the lens module and a section that extends between an end of the lens module and an image sensor;
   a reflection reducing member disposed on at least a portion of an inner surface of the section of the shielding member that extends between the exit surface of the optical path conversion unit and the front of the lens module and a portion of an inner surface of the section of the shielding member that extends between the end of the lens module and the image sensor, and configured to reduce internal reflections from the inner surface of the shielding member occurring between the exit surface of the optical path conversion unit and the front of the lens module and between the end of the lens module and the image sensor; and
   a second driving unit configured to move the optical path conversion unit in a direction intersecting an optical axis of the lens module,
   wherein a distance from the end of the lens module to the image sensor is greater than a distance from the exit surface of the optical path conversion unit to the front of the lens module, and
   wherein a thickness of the reflection reducing member disposed on the portion of the inner surface of the section of the shielding member that extends between the end of the lens module and the image sensor is greater than a thickness of the reflection reducing member disposed on the portion of the inner surface of the section of the shielding member that extends between the exit surface of the optical path conversion unit and the front of the lens module.

2. The camera module of claim 1, wherein the reflection reducing member is a tape attached to the inner surface of the shielding member.

3. The camera module of claim 2, wherein the reflection reducing member comprises a plurality of holes.

4. The camera module of claim 1, wherein the reflection reducing member is a paint applied to the inner surface of the shielding member.

5. The camera module of claim 4, wherein the reflection reducing member comprises particles having a reflectance low enough to substantially prevent reflection of light.

6. The camera module of claim 1, wherein an inner surface of the reflection reducing member is inclined with respect to the inner surface of the shielding member.

7. The camera module of claim 1, further comprising a first driving unit configured to move the lens module in a direction of an optical axis of the lens module.

8. The camera module of claim 1, wherein the camera module further comprises:
   a first movable body disposed in the housing and configured to rotate in a first direction; and
   a second movable body configured to receive the optical path conversion unit and rotate in a second direction intersecting the first direction.

9. A camera module comprising:
   a housing comprising an opening;
   an optical path conversion unit disposed in the housing;
   an image sensor disposed in the housing or mounted on the housing;
   a lens module disposed in the housing between the optical path conversion unit and the image sensor and spaced apart from the image sensor such that a distance from an end of the lens module to the image sensor is greater than a distance from an exit surface of the optical path conversion unit to a front of the lens module;
   a shielding member disposed on the housing and covering the opening of the housing, the shielding member including a section that extends between an exit surface of the optical path conversion unit and a front of the lens module and a section that extends between an end of the lens module and the image sensor;
   a reflection reducing member disposed on at least a portion of an inner surface of the section of the shielding member that extends between the exit surface of the optical path conversion unit and the front of the lens module and a portion of an inner surface of the section of the shielding member that extends between the end of the lens module and the image sensor, and configured to reduce the internal reflections from the inner surface of the shielding member occurring at least between the exit surface of the optical path conversion unit and the front of the lens module and between the lens module and the image sensor; and
   a driving unit configured to move the optical path conversion unit in a direction intersecting an optical axis of the lens module,
   wherein the opening of the housing exposes the optical path conversion unit and the lens module to an inner surface of the shielding member, and
   wherein a thickness of the reflection reducing member disposed on the portion of the inner surface of the section of the shielding member that extends between the end of the lens module and the image sensor is greater than a thickness of the reflection reducing member disposed on the portion of the inner surface of the section of the shielding member that extends between the exit surface of the optical path conversion unit and the front of the lens module.

10. The camera module of claim 9, wherein the reflection reducing member comprises a tape attached to the inner surface of the shielding member, or a film attached to the inner surface of the shielding member, or a paint applied to the inner surface of the shielding member, and the tape, the film, or the paint is configured to reduce the internal reflections from the inner surface of the shielding member occurring at least between the lens module and the image sensor.

11. The camera module of claim 9, wherein the reflection reducing member comprises a plurality of holes configured to reduce the internal reflections from the inner surface of the shielding member occurring at least between the lens module and the image sensor.

12. The camera module of claim 9, wherein the reflection reducing member comprises a plurality of particles configured to reduce the internal reflections from the inner surface of the shielding member occurring at least between the lens module and the image sensor.

13. The camera module of claim 9, wherein the shielding member is configured to reduce the internal reflections from the inner surface of the shielding member occurring at least between the lens module and the image sensor.

14. The camera module of claim 13, wherein the shielding member comprises a plurality of protrusions formed on the inner surface of the shielding member and configured to reduce the internal reflections from the inner surface of the shielding member occurring at least between the lens module and the image sensor, or the shielding member comprises a plurality of grooves formed in the inner surface of the shielding member and configured to reduce the internal reflections from the inner surface of the shielding member occurring at least between the lens module and the image sensor.

15. The camera module of claim 13, wherein the shielding member comprises a plurality of protrusions formed on the inner surface of the shielding member, or a plurality of grooves formed in the inner surface of the shielding member, the camera module further comprises a reflection reducing member disposed on the inner surface of the shielding member, and the reflection reducing member comprises protrusions or grooves conforming to the protrusions or the grooves of the shielding member and configured to reduce the internal reflections from the inner surface of the shielding member occurring at least between the lens module and the image sensor.

16. The camera module of claim 15, wherein the reflection reducing member further comprises a plurality of particles configured to reduce the internal reflections from the inner surface of the shielding member occurring at least between the lens module and the image sensor.

* * * * *